United States Patent [19]
Dokurno

[11] Patent Number: 5,407,732
[45] Date of Patent: Apr. 18, 1995

[54] MULTI-LAYER COEXTRUDED POLYOLEFIN STRETCH WRAP FILMS

[75] Inventor: Mark G. Dokurno, Ontario, Canada

[73] Assignee: Mobil Oil Corporation, Fairfax, Va.

[21] Appl. No.: 144,945

[22] Filed: Oct. 29, 1993

[51] Int. Cl.⁶ ............................................. B32B 7/02
[52] U.S. Cl. .................................... 428/213; 428/218; 428/500; 428/516; 525/240; 156/244.11
[58] Field of Search ............... 428/516, 500, 336, 218, 428/213; 525/240; 156/244.11

[56] References Cited

U.S. PATENT DOCUMENTS

| | | | |
|---|---|---|---|
| 4,364,981 | 12/1982 | Horner et al. | 428/35 |
| 4,367,256 | 1/1983 | Biel | 428/218 |
| 4,399,173 | 8/1983 | Anthony et al. | 428/35 |
| 4,399,180 | 8/1983 | Briggs et al. | 428/212 |
| 4,511,609 | 4/1985 | Craver et al. | 428/35 |
| 4,518,654 | 5/1985 | Eichbauer et al. | 428/331 |
| 4,542,188 | 9/1985 | van der Heijden | 525/240 |
| 4,565,720 | 1/1986 | Yaeo et al. | 428/35 |
| 4,574,104 | 3/1986 | Aishima et al. | 428/220 |
| 4,657,811 | 4/1987 | Boyd et al. | 428/318.6 |
| 4,996,094 | 2/1991 | Dutt | 428/212 |
| 5,334,428 | 8/1994 | Dobreski et al. | 428/34.9 |

Primary Examiner—Edith Buffalow
Attorney, Agent, or Firm—Alexander J. McKillop; Malcom D. Keen; L. Gene Wise

[57] ABSTRACT

The present invention relates to novel multi-layer coextruded thermoplastic stretch wrap films useful for the packaging or palletizing of goods. The films of this invention comprise at least three layers, the three layers having first and second outer layers and an intermediate layer positioned between the first and second outer layers, the first outer layer comprising about 70 to about 98 weight percent of a linear low density polyethylene and about 2 to about 30 weight percent of a low density polyethylene produced by high pressure polymerization, the intermediate layer comprising about 65 to about 85 weight percent of a linear low density polyethylene and about 15 to about 35 weight percent of a low density polyethylene produced by high pressure polymerization, and the second outer layer comprising about 90 to about 99 weight percent of a linear low density polyethylene and about 1 to about 10 weight percent of a low density polyethylene produced by high pressure polymerization.

19 Claims, No Drawings

MULTI-LAYER COEXTRUDED POLYOLEFIN STRETCH WRAP FILMS

FIELD OF THE INVENTION

The present invention is directed to stretch wrap polyolefinic films and methods for their production. The films of this invention are particularly useful for the wrapping of palletized loads.

BACKGROUND OF THE INVENTION

The use of thermoplastic stretch wrap films for the overwrap packaging of goods, and in particular, the unitizing of palleted loads, is a commercially significant application of polymer film, including generically, polyethylene. Overwrapping a plurality of articles to provide a unitized load can be achieved by a variety of techniques. In one procedure, the load to be wrapped is positioned upon a platform, or turntable, which is made to rotate and in so doing, to take up stretch wrap film supplied from a continuous roll. Braking tension is applied to the film roll so that the film is continuously subjected to a stretching, or tensioning, force as it wraps around the rotating load in overlapping layers. Generally, the stretch wrap film is supplied from a vertically arranged roll positioned adjacent to the rotating pallet load. Rotational speeds of from about 5 to about 50 revolutions per minute are common. At the completion of the overwrap operation, the turntable is completely stopped and the film is cut and attached to an underlying layer of film employing tack sealing, adhesive tape, spray adhesives, etc. Depending upon the width of the stretch wrap roll, the load being overwrapped can be shrouded in the film while the vertically arranged film roll remains in a fixed position. Alternatively, the film roll, for example, in the case of relatively narrow film widths and relatively wide pallet loads, can be made to move in a vertical direction as the load is being overwrapped whereby a spiral wrapping effect is achieved on the packaged goods. Another wrapping method finding acceptance in industry today is that of hand wrapping. In this method, the film is again arranged on a roll, however, it is hand held by the operator who walks around the goods to be wrapped, applying the film to the goods. The roll of film so used may be installed on a hand-held wrapping tool for ease of use by the operator.

Some of the properties desired of a good stretch wrap film are as follows: good cling or cohesion properties, good transparency, low stress relaxation with time, high resistance to transverse tear when under machine direction tension, producible in thin gauges, low specific gravity and thus high yield in area per pound, good tensile toughness, high machine direction ultimate tensile strength, high machine direction ultimate elongation, high modulus of elasticity, high puncture resistance.

Physical properties which are particularly significant for the successful use of thermoplastic films in stretch wrap applications include their puncture resistance, their elongation characteristics, their toughness, and their resistance to tearing while under tension. In general, tensile toughness is measured as an area under a stress-strain curve developed for a thermoplastic film, and it may be considered as the tensile energy absorbed, expressed in units of ft.-lbs./cu.in. to elongate a film to break under tensile load. In turn, this toughness characteristic is a function of the capacity of such films to elongate. The process of stretching the film decreases that capacity. Accordingly, the stretch wrap process will decrease the toughness of the film while it is in its stretched condition as an overwrap as compared to unstretched counterparts, including such materials as shrink wrap. Generally this loss of toughness is proportional to the amount of stretch imparted to the film as it is overwrapping a load of goods.

As hereinabove indicated, the resistance to tear characteristic of such films will obviously be an important physical characteristic for stretch wrap applications since if the edge of the stretch film roll is nicked, abraded or in any way weakened before stretching or during the stretching operation, premature tearing of the film will usually occur during wrapping or subsequent handling of the load of goods.

Some resins which have been used in the fabrication of stretch wrap film are polyethylene, polyvinylchloride and ethylene vinyl acetate. A fairly recent development has been the utilization of linear low density polyethylene (LLDPE) in the manufacture of stretch wrap film, e.g., as described in U.S. Pat. Nos. 4,399,180, 4,418,114 and 4,518,654, the contents of which are incorporated by reference herein. The excellent toughness and puncture resistance properties of LLDPE makes it an excellent resin for such an application. LLDPE and methods for its manufacture are described in, among others, U.S. Pat. Nos. 3,645,992, 4,076,698, 4,011,382, 4,163,831, 4,205,021, 4,302,565, 4,302,566, 4,359,561 and 4,522,987. In general, films fabricated from the typical LLDPE resins of commerce possess little or no cling property on either surface thereof in the absence of added cling agent. LLDPE films possessing an inherent cling property wherein the LLDPE possesses a relatively high level of n-hexane extractables are disclosed in application Ser. No. 039,892, filed Apr. 17, 1987, the contents of which are incorporated by reference in their entirety.

Other thermoplastic films possessing a cling property are known in the art. U.S. Pat. No. 4,311,808 describes a cling film containing a homogeneous mixture of polyisobutylene, ethylene-propylene and a low density polyethylene.

U.S. Pat. No. 4,367,256 describes a cling wrap plastic film based on a blend of high pressure low density polyethylene (HPLDPE) and LLDPE in which the latter resin represents from 5–16 weight percent of the total. In one embodiment, this film is sandwiched between two HPLDPE films.

U.S. Pat. No. 4,399,173 describes a multilayer plastic film free of melt fracture which is suitable for a variety of applications including, by implication, the stretch wrapping of goods. The film possesses a core layer of LLDPE resin of melt index 0.2–3.0 decigrams per minute and skin layers of LLDPE resin of melt index 5.0–20.2 decigrams per minute.

U.S. Pat. Nos. 4,399,180 and 4,418,114 describe a coextruded composite stretch wrap film in which an LLDPE core layer is surfaced with HPLDPE skin layers.

In the one-sided cling stretch wrap film of U.S. Pat. No. 4,518,654, layer A of the disclosed A/B structure is fabricated from a resin possessing an inherent cling property and/or a cling property resulting from the incorporation of a cling additive therein. Layer A is coextruded with layer B, which is fabricated from a resin exhibiting little if any cling. Layer B further exhibits a slide property when in contact with a layer of itself with relative motion therebetween. Layer B can contain an anti-cling additive at a level of from about 0.05 to about 2.0 weight percent of the resin component of the layer, and can consist of such materials as crystalline and amorphous silicate. In each of the two working examples of this patent, layer A is an LLDPE film containing a cling additive, namely, polyisobutylene, with synthetic sodium silicate particles being uniformly incorporated throughout layer B of the film of Example 1 and amorphous silica particles being uniformly incorporated throughout layer B of the film of Example 2. Layer B, the layer providing the noncling surface of the films of Examples 1 and 2 is HPLDPE. Improved one-sided cling/one-sided slip stretch wrap films are disclosed in application Ser. No. 249,525, filed Sep. 26, 1988.

Other multi-layer composite films known include those disclosed in U.S. Pat. No. 4,364,981 in which polyethylene films comprising a core or intermediate layer of low pressure low density polyethylene (LPLDPE) and skin layers of high pressure low density polyethylene (HPLDPE) are taught. The LPLDPE described within U.S. Pat. No. 4,364,981 is actually an LLDPE, as may be seen by reference to the process for making LLDPE of U.S. Pat. No. 4,011,382 disclosed at column 1, lines 52-55. The films disclosed are said to be useful in forming bags such as trash bags. No disclosure of possible utility as a stretch wrap may be found within this patent.

U.S. Pat. No. 4,565,720 discloses three layer packaging bags in which an intermediate layer comprising a mixture of LLDPE and high density polyethylene (HDPE) is taught. Outer layers of the bags are made of HPLDPE or a mixture of HPLDPE and an ethylene-vinyl acetate copolymer. The structures disclosed are not cited as being useful in forming stretch wrap films.

A multi-layer film in which the intermediate layer comprises LLDPE and HDPE and the outer layers comprise an LLDPE and at least one such outer layer further comprises an HPLDPE is disclosed in U.S. Pat. No. 4,574,104. One film disclosed therein is a three-layer structure in which the intermediate layer comprises LLDPE, HPLDPE and HDPE. Packaging bags are the chief utility cited for these multi-layer films. No disclosure of utility as a stretch wrap is made.

U.S. Pat. No. 4,511,609 discloses a multi-layer film for use in the manufacture of garbage bags wherein the film comprises a first outer layer of LLDPE, a second outer layer of HPLDPE and a intermediate layer also of HPLDPE or a blend of LLDPE and HPLDPE. No statement as to whether the films disclosed have any possible utility as stretch wraps is made within this patent.

In U.S. Pat. No. 4,657,811, a three-layer plastic film suitable for use in trash bag manufacturing is disclosed wherein an intermediate layer of foamed HPLDPE is disposed between outer layers of LLDPE. Again, the films disclosed are not cited as finding utility as stretch wrap films.

As previously indicated, methods of stretch wrapping articles, containers, etc., are known. U.S. Pat. No. 3,986,611 describes a tension-wrapped palletized load obtained with a stretch wrap film possessing a cling additive.

U.S. Pat. No. 4,079,565 describes a stretch-wrapped package, process and apparatus which employs a stretch wrap polyethylene film.

U.S. Pat. No. 4,409,776 discloses a method and apparatus for packaging articles with a composite stretch wrap film, one surface of which is nonadhesive. The adhesive surface is obtained with an "adhesive film" such as one fabricated from ethylene-vinyl acetate copolymer, 1,2-polybutadiene or styrenebutadiene copolymer and the nonadhesive surface is obtained with a "nonadhesive film" such as one fabricated from a crystalline polyolefin, e.g., polyethylene, polypropylene or ethylene-propylene copolymer.

While it is apparent that a wide variety of stretch wrap films have been disclosed for use in packaging or palletizing operations, most suffer from one or more notable deficiencies. Not all films known in the art possess good on-load stretched cling properties. Other films are deficient in their tensile properties, including the force required in the machine direction (MD) to stretch the film. Also, not all end use applications require the same film characteristics, necessitating the complex production of a broad range of films to suit these applications.

Therefore, what is needed is a stretch wrap film having improved strength and toughness, with superior film cling and reduced unwind friction characteristics, which is suitable for all load types encountered in pallet wrapping applications.

SUMMARY OF THE INVENTION

In accordance with the present invention, a thermoplastic stretch wrap film is provided which comprises at least three layers, the three layers having first and second outer layers and an intermediate layer positioned between the first and second outer layers, the first outer layer comprising about 70 to about 98 weight percent of a linear low density polyethylene and about 2 to about 30 weight percent of a low density polyethylene produced by high pressure polymerization, the intermediate layer comprising about 65 to about 85 weight percent of a linear low density polyethylene and about 15 to about 35 weight percent of a low density polyethylene produced by high pressure polymerization, and the second outer layer comprising about 90 to about 99 weight percent of a linear low density polyethylene and about 1 to about 10 weight percent of a low density polyethylene produced by high pressure polymerization.

It is therefore an object of the present invention to provide a novel multi-layered coextruded film which exhibits good stretched cling and sufficient machine direction force to stretch which is useful in industrial pallet wrapping applications.

It is a further object of the present invention to provide a process for the production of the novel films of this invention.

It is yet a further object to overcome the aforementioned problems in an effective and economical manner.

Other objects of the invention include the use of a stretch wrap film of the aforementioned characteristics in the overwrapping of a plurality of goods, e.g., a pallet load, to provide a unitized packaged unit.

Further objects of this invention will become apparent from a reading of the specification and appended claims.

DETAILED DESCRIPTION OF THE INVENTION

The present invention relates to the formation of a laminar stretch wrap thermoplastic film by initially preparing the coextruded stretch wrap product utilizing conventional blown film coextrusion techniques. The material construction of the laminate prepared in accordance with the following examples comprise at least three layers, the three layers having first and second outer layers and an intermediate layer positioned between the first and second outer layers, the first outer layer comprising about 70 to about 98 weight percent of a linear low density polyethylene and about 2 to about 30 weight percent of a low density polyethylene produced by high pressure polymerization, the intermediate layer comprising about 65 to about 85 weight percent of a linear low density polyethylene and about 15 to about 35 weight percent of a low density polyethylene produced by high pressure polymerization, and the second outer layer comprising about 90 to about 99 weight percent of a linear low density polyethylene and about 1 to about 10 weight percent of a low density polyethylene produced by high pressure polymerization. The polymeric blends employed in the present invention provide the requisite strength and toughness properties necessary for stretch film applications.

The olefin polymer resins employed in the stretch wrap films of the present invention include those ethylenic copolymers which comprise a major proportion by weight of ethylene copolymerized with a minor proportion by weight of an alpha olefin monomer containing 4 to 10 carbon atoms. Such ethylenic copolymers as mentioned are commonly referred to as linear low density polyethylenes (LLDPE). By the use of the term minor proportion by weight of an alpha olefin monomer is meant a proportion which does not exceed the proportion, by weight, of ethylene present in the copolymer, in other words, a proportion of alpha olefin monomer less than 50 weight percent. Preferably the ethylenic copolymers employed are those having from about 1 to about 20 weight percent of said higher alpha olefin monomer copolymerized therein. In addition, it is also preferred that the alpha olefin monomer employed in the ethylenic copolymer be selected from the group consisting of butene-1, 3-methyl-butene-1, 3-methyl-pentene-1, hexene-1, 4-methyl-pentene-1, 3-methyl-hexene-1, octene-1 and decene-1. Particularly preferred are the hexene-1 and octene-1 alpha olefins. The LLDPE resins are prepared at relatively low pressures employing coordination-type catalysts. Reference may be made to U.S. Pat. Nos. 3,645,992, 4,076,698, 4,011,382, 4,163,831, 4,205,021, 4,302,565, 4,302,566, 4,359,561 and 4,522,987 for more details of the manufacture and properties of LLDPE resins including those which are particularly useful herein.

As discussed above, application Ser. No. 039,892 disclosed the discovery that certain LLDPE resins can possess an inherent cling property in the absence of added cling agents. Those resins were found to possess a relatively high weight percentage of n-hexane extractables, as measured by the n-hexane extractables method of 21 C.F.R. 177.1520. Although it has not been confirmed that the n-hexane extractables are, in fact, the cause of the inherent cling property of the stretch wrap film disclosed in Ser. No. 039,892, a correlation between cling and the level of such extractables was disclosed therein, lending support to the view that the extractables are indeed responsible for the cling behavior. These LLDPE resins are particularly preferred in the practice of the present invention. Preferably, the LLDPE used in the outer film layers herein will contain from about 4 to about 10 and still more preferably, from about 5 to about 8, weight percent of n-hexane extractables.

The LLDPE resins of this invention have a density ranging from about 0.905 to about 0.940 gm/c.c. and a melt index of from about 1 to about 10. Particularly preferred are those LLDPE resins possessing densities within the range from about 0.917 to 0.920 gm/c.c. and melt indices within the range from about 2.0 to 5.0.

The high pressure low density polyethylenes (HPLDPE) useful in the practice of this invention are those having a density within the range from about 0.905 to about 0.940 gm/c.c., with a melt index within the range from about 1 to 25. Particularly preferred are those HPLDPE's having a density within the range from about 0.918 to about 0.922 gm/c.c., with a melt index within the range from about 1.0 to 15.0. Still more preferred are those HPLDPE's having a melt index within the range from about 1.0 to 10.0. As will be described in more detail below, HPLDPE's having broad or narrow molecular weight distributions are useful in the practice of this invention, with the selection of a preferred distribution dependent upon the resultant film requirements.

The skin layer or intermediate layer resins can be blended or alloyed with minor amounts, e.g., up to about 20 weight percent total, of one or more other suitable resins to achieve a desired range of physical/mechanical properties in the film product. Thus, for example, an EVA copolymer may be used for blending to obtain useful mixtures for forming the outer layers of the films of this invention.

The skin layer resin blend can also contain known and conventional cling additives to provide or augment the cling property. Examples of useful cling additives include polyisobutylenes having a number average molecular weight in the range of from about 1,000–3,000 grams per mole as measured by vapor phase osmometry, amorphous atactic polypropylenes, e.g., those having an average molecular weight of about 2000, polyterpenes and ethylene-vinyl acetate copolymers containing from about 5–15 weight percent copolymerized vinyl acetate. The cling additive can be present in the outer layers in a concentration of from about 0.5 to about 10 pounds per 100 pounds of resin. Of course, other conventional film additives such as antioxidants, UV stabilizers, pigments, dyes, etc., can be present in the usual amounts.

The most particularly preferred coextruded blown stretch wrap film comprise an intermediate layer (B) which is 70% to 85% by weight of the total film and two skin layers (A & C) each 7.5% to 15% by weight, and all of ethylene polymers. The intermediate layer comprises 67.5% to 85% of copolymers of ethylene with a $C_4$–$C_8$ higher olefin having a density of 0.917 to 0.920 g/cc and a melt index of 1.3 to 2.0 dg/min; with 14.25% to 30% of a LDPE with a density of 0.919 to 0.923 g/cc and melt index of 6.0 to 8.0 dg/min. The skin layer (A) comprises 73% to 96% of copolymers of ethylene with a $C_4$ to $C_8$ higher olefins having a density of 0.917 to 0.920 g/cc and a melt index of 0.70 to 1.0 dg/cc; with 3.4% to 24.5% of a LDPE with a density of 0.919 to 0.923 g/cc and a melt index of 6.0 to 8.0 dg/min. The skin layer (C) comprises 92.5% to 96% of copolymers of ethylene with a $C_4$ to $C_8$ higher olefins having a density of 0.90 to 0.91 g/cc and a melt index of 1.0 to 2.0 dg/cc; with 0% to 4% of a LDPE with a density of 0.919 to 0.923 g/cc and a melt index of 6.0 to 8.0 dg/min. The film also contains a cling additive selected from the group consisting of a low molecular weight polyisobutylene, polyterpenes and amorphous polyolefins and a friction modifier to improve film unwind. The friction modifier which is particularly preferred in the practice of the present invention is glycerol monooleate.

The multi-layer film compositions of this invention have been found to provide good stretched cling and high machine direction force to stretch which are desirable features in industrial pallet wrapping applications.

The film thickness, of these multi-layer films can vary widely and in general, can be a thickness which is typical for stretch wrap films. A total film thickness of from about 0.4 to about 2.5 mils, preferably from about 0.8 to about 2.0 mils, is suitable for most applications. In the case of multi-layer films constructed in accordance with this invention, the outer layers together can represent from about 15 to about 30, and preferably from 20 to about 25, percent, by weight, of the total film structure with the intermediate layers representing the balance of the thickness.

Either or both major surfaces of the film can be treated by such known and conventional post-forming operations as corona discharge, chemical treatment, flame treatment, etc., to modify the printability or ink receptivity of the surface(s) or to impart other desirable characteristics thereto.

The stretch wrap film of this invention can, if desired, be provided in the non-stretched, i.e., unoriented, or at most only modestly stretched, state prior to use. Thus, the film herein can be capable of undergoing stretch from less than about 50 to about 500, and preferably from about 75 to about 400, linear percent during the overwrapping operation.

It is preferred to employ known and conventional techniques of blown film coextrusion to assemble the composite structures of the films of this invention.

The pallet unitizing techniques described in U.S. Pat. Nos. 3,986,611 and 4,050,221 are contemplated herein. The disclosures of these patents are incorporated herein in their entirety by reference.

The following demonstrate the extent of the unexpected results obtained with the multi-layer stretch wrap films of the present invention. The invention is illustrated by the following non-limiting examples:

EXAMPLES

The films produced in accordance with the present invention, Examples 1-5, were made on a commercial 3-layer blown film line consisting of one 6" extruder with a 5 component gravimetric blender, gravimetric feed and liquid feed capability and two 2.5" extruder with 2 component gravimetric blenders, gravimetric feed and liquid feed. The line is equipped with a 24" diameter blown film oscillating die with internal bubble cooling. The line was operated at 1200 to 1400 lb/hr with the bubble cooling air at 40° F. and the melt temperature at 420° F. The film blow-up ratio was 2.2 to 2.5.

Example 1

A 3-layer stretch film was produced having an intermediate layer (B) blend comprised of 82.5% octene copolymer LLDPE with a density of 0.918 g/cc and melt index of 1.3 dg/min, sold under the trade designation 2243A by DOW Chemical Company; 14.25% HPLDPE having a density of 0.918 g/cc and melt index of 7.0 dg/min, sold under the trade designation LF-718-A by Novacor Chemicals Ltd.; 2.5 polyisobutylene (PIB), sold under the trade designation H300 by Amoco Chemicals Co. and 0.75% of glycerol monooleate friction modifier. The first skin layer (A) comprised 93% of an octene copolymer LLDPE with a density of 0.917 g/cc and melt index of 0.8 dg/min, sold under the trade designation 2267 by Dow Chemical Company; 4.5% HPLDPE Novacor LF-718-A; 2.0% Polyisobutylene Amoco H300 and 0.5% glycerol monooleate. The second skin (C) was comprised of 91.0% of a hexene copolymer LLDPE with a density of 0.910 g/cc and melt index of 1.0 dg/cc, sold under the trade designation Flexomer 9064 by Union Carbide; 4.5% Novacor HPLDPE LF-718-A; 4.0% polyisobutylene Amoco H300 and 0.5% glycerol monooleate. The intermediate layer comprised 80%, by weight, of the total structure, with each skin layer comprising 10%, by weight. Film gauges produced were 0.75 mil and 0.80 mil. The film so produced was slit in line to produce 20" wide by 6000' long rolls on 3" cores.

The film produced in accordance with this example was wrapped over a 3' cube using a Muller stretch wrapping machine. The film successfully stretched to 275% without failure. At 275% stretch the film exhibited superior clarity, good cling and low unwind resistance.

Example 2

A series of 20" wide by 6000' long, 0.8 mil stretch film samples on 3" cores were produced in the same manner as outlined in example 1 using the compositions set forth below:

| LAYER | COMPONENT | BLEND 1 | BLEND 2 | BLEND 3 |
| --- | --- | --- | --- | --- |
| Core | DOW 2243A | 72.5% | 75.0% | 67.5% |
| Layer B | Novacor LF-718-A | 24.5% | 22.13% | 29.25% |
| 80% | H300 | 2.5% | 2.5% | 2.5% |
| | Glycerol | 0.5% | 0.37% | 0.75% |
| Layer A | DOW 2267 | 73.0% | 80.0% | 94.0% |
| 10% | Novacor LF-718-A | 24.5% | 17.63% | 24.25% |
| | H300 | 2.0% | 2.0% | 2.0% |
| | Glycerol monooleate | 0.5% | 0.37% | 0.5% |
| Layer C | UCC 9064 | 95.5% | 95.5% | 95.5% |
| 10% | H300 | 4.0% | 4.0% | 4.0% |
| | Glycerol monooleate | 0.5% | 0.5% | 0.5% |

The films produced in accordance with this example all exhibited good film clarity, good cling and low unwind noise.

Example 3

A series of 20" and 30" wide, 0.60, 0.75, 0.80, 1.0 and 1.15 mil stretch film samples were produced on 3" core were produced using the compositions set forth below:

| LAYER | COMPONENT | BLEND |
| --- | --- | --- |
| Core Layer B | DOW 2243A | 82.5% |
| 80% | Novacor LF-718-A | 14.5% |
| | H300 | 2.5% |
| | Glycerol monooleate | 0.5% |
| Layer A | DOW 2267 | 93.0% |
| 10% | Novacor LF-718-A | 4.5% |
| | H300 | 2.0% |
| | Glycerol monooleate | 0.5% |
| Layer C | UCC 9064 | 92.5% |
| 10% | Novacor LF-718-A | 4.5% |
| | H300 | 2.5% |

-continued

| LAYER | COMPONENT | BLEND |
|---|---|---|
| | Glycerol monooleate | 0.5% |

Again, the films produced in accordance with this example all exhibited good film clarity, good cling and low unwind noise.

Example 4

A series of 0.8 mil stretch film samples 20" wide by 6000' long on 3" cores were produced in the same manner as outlined in example using a LLDPE butene copolymer resin with a density of 0.918 g/cc and a melt index of 2.0 dg/min sold under the trade designation PF-0218-F were produced with the

| LAYER | COMPONENT | BLEND 1 | BLEND 2 |
|---|---|---|---|
| Core Layer B 80% | DOW 2243A | 72.5% | 67.5% |
| | Novacor PF-218-F | 10.0% | 15.0% |
| | Novacor LF-718-A | 14.5% | 14.5% |
| | H300 | 2.5% | 2.5% |
| | Glycerol monooleate | 0.5% | 0.5% |
| Layer A 10% | DOW 2267 | 93.0% | 93.0% |
| | Novacor LF-718-A | 4.5% | 4.5% |
| | H300 | 2.0% | 2.0% |
| | Glycerol monooleate | 0.5% | 0.5% |
| Layer C 10% | UCC 9064 | 92.5% | 92.5% |
| | Novacor LF-718-A | 4.5% | 4.5% |
| | H300 | 2.5% | 2.5% |
| | Glycerol monooleate | 0.5% | 0.5% |

Once again, the films produced in accordance with this example all exhibited good film clarity, good cling and low unwind noise.

Example 5

A series of 20" wide by 6000' long, 0.8 mil stretch film samples on 3" cores were produced in the same manner as example 1 with the compositions set forth below:

| LAYER | COMPONENT | BLEND 1 | BLEND 2 | BLEND 3 | BLEND 4 |
|---|---|---|---|---|---|
| Core Layer B 80% | DOW 2243A | 85.0% | 85.0% | 83.0% | 83.0% |
| | Novacor LF-718-A | 14.6% | 14.4% | 14.6% | 14.4% |
| | H300 | 0.0% | 0.0% | 2.0% | 2.0% |
| | Glycerol monooleate | 0.4% | 0.6% | 0.4% | 0.6% |
| Layer A 10% | DOW 2267 | 96.0% | 94.0% | 94.0% | 92.0% |
| | Novacor LF-718-A | 3.6% | 3.4% | 3.6% | 3.4% |
| | H300 | 0.0% | 0.0% | 2.0% | 2.0% |
| | Glycerol monooleate | 0.4% | 0.6% | 0.4% | 0.4% |
| Layer C 10% | UCC 9064 | 96.0% | 92.5% | 94.0% | 94.0% |
| | Novacor LF-718-A | 3.6% | 3.4% | 3.6% | 3.4% |
| | H300 | 0.0% | 0.0% | 2.0% | 2.0% |
| | Glycerol monooleate | 0.4% | 0.6% | 0.4% | 0.6% |

Once again, the films produced in accordance with this example all exhibited good film clarity, good cling and low unwind noise.

Example 6

A cast stretch film is produced in accordance with Example 8 of U.S. Pat. No. 5,334,428 (Dobresky et al), filed 28 Dec. 1994 as U.S. application Ser. No. 07/997,411 and incorporated herein by reference.

| TEST PROPERTY | FILM OF EX. 1 | FILM OF EX. 6 (Dobresky etc.) |
|---|---|---|
| Break Performance @ 200% stretch | 0 | 0 |
| Break Performance @ 250% stretch | 0 | 0 |
| Break Performance @ 300% stretch | 5.5 | 0.4 |
| Flaw Sensitivity, in % stretch | 399 | 205 |
| Ultimate Stretch, in % stretch | 439 | 357 |
| Load Retention, in lbs. | 33 | 37 |
| Unstretched Cling, in grams | 178 | 113 |
| Stretched Cling, in grams | 109 | 98 |
| Unwind Noise, in dB | 74 | 60 |
| Puncture Force | 201 | 394 |
| Dart Drop | 66 | 154 |
| 45 Degree Gloss | 93 | 75 |
| Contact Haze | 1.8 | 2.1 |
| Clarity | 23 | 74 |

As those skilled in the art will plainly recognize, a film produced in accordance with the present invention possesses superior properties when compared to the film produced of Example 6.

Although the present invention has been described with preferred embodiments, it is to be understood that modifications and variations may be utilized without departing from the spirit and scope of this invention, as those skilled in the art will readily understand. Such modifications and variations are considered to be within the purview and scope of the appended claims.

What is claimed is:

1. A thermoplastic stretch wrap film having enhanced elongation break performance and puncture resistance comprising at least three layers comprising linear low density polyethylene consisting essentially of ethylene copolymerized with a minor amount of at least one alpha olefin having 4 to 8 carbon atoms, said three layers having first and second outer layers and an intermediate layer positioned between said first and second outer layers;
   (a) said first outer layer comprising about 70 to about 98 weight percent of a linear low density polyethylene and about 2 to about 30 weight percent of a low density polyethylene produced by high pressure polymerization;
   (b) said intermediate layer comprising about 65 to about 85 weight percent of a linear low density polyethylene and about 15 to about 35 weight percent of a low density polyethylene produced by high pressure polymerization and said intermediate layer comprising 65 to 85 percent by weight of total film; and (c) said second outer layer comprising about 90 to about 99 weight percent of a linear low density polyethylene and about 1 to about 10 weight percent of a low density polyethylene produced by high pressure polymerization.

2. A film according to claim 1, wherein said alpha olefin is present in each of said linear low density polyethylenes in an amount of about 1 to 20 weight percent total and is a member selected from the group consisting of butene-1; 3-methyl-butene-1; 3-methyl-pentene-1; 4-methyl-pentene-1; hexene-1; 3-methyl-hexene-1; octene-1; decene-1 and mixtures thereof.

3. A film according to claim 2, wherein said alpha olefin of said first skin layer linear low density polyethylene is octene-1.

4. A film according to claim 3, wherein said alpha olefin of said second skin layer linear low density polyethylene is hexene-1.

5. A film according to claim 4, wherein said alpha olefin of said intermediate layer linear low density polyethylene is octene-1.

6. A film according to claim 5, wherein each of said linear low density polyethylenes have a density of about 0.905 to 0.940 grams/c.c. and a melt index of about 1.0 to 10.0.

7. A film according to claim 6, wherein said linear low density polyethylene has a melt index from about 1.0 to 5.0 and a density from about 0.910 to 0.920 grams/c.c.

8. A film according to claim 7, wherein each of said high pressure low density polyethylene have a density of about 0.915 to 0.940 grams/c.c. and a melt index of about 1 to 25.

9. A film according to claim 8, wherein said intermediate layer of high pressure low density polyethylene has a density of about 0.919 to 0.923 grams/c.c. and a melt index of about 6.0 to 8.0.

10. A film according to claim 9, wherein said intermediate layer thickness is between about 70 and 85 percent by weight of overall film thickness.

11. A film according to claim 10, whereby the film is capable of stretching upon exerting a force during application of the film to an article or group of articles to be wrapped from less than about 50 to 500 linear percent.

12. A method for preparing a thermoplastic stretch wrap film capable of stretching upon exerting a force during application of the film to an article or group of articles to be wrapped comprising the step of:
coextruding a film having at least three layers, said three layers having two outer layers and an intermediate layer positioned between said outer layers; said first outer layer comprising about 70 to about 98 weight percent of a linear low density polyethylene and about 2 to about 30 weight percent of a low density polyethylene produced by high pressure polymerization; said intermediate layer comprising about 65 to about 85 weight percent of a linear low density polyethylene and about 15 to about 35 weight percent of a low density polyethylene produced by high pressure polymerization; and said second outer layer comprising about 90 to about 99 weight percent of a linear low density polyethylene and about 1 to about 10 weight percent of a low density polyethylene produced by high pressure polymerization.

13. The method of claim 12, wherein said coextruding step is a blown-film extrusion step.

14. The method of claim 13, wherein each of said linear low density polyethylenes consist essentially of ethylene copolymerized with a minor amount of at least one alpha olefin having from 4 to 8 carbon atoms.

15. The method of claim 14, wherein said alpha olefin is present in each of said linear low density polyethylenes in an amount of about 1 to 20 weight percent total and is a member selected from the group consisting of butene-1; 3-methyl-butene-1; 3-methyl-pentene-1; 4-methyl-pentene-1; hexene-1; 3-methyl-hexene-1; octene-1; decene-1 and mixtures thereof.

16. The method of claim 15, wherein said alpha olefin of said first skin layer linear low density polyethylene is octene-1.

17. The method of claim 16, wherein said alpha olefin of said second skin layer linear low density polyethylene is hexene-1.

18. The method of claim 17, wherein said alpha olefin of said intermediate layer linear low density polyethylene is octene-1.

19. The method of claim 18, wherein each of said linear low density polyethylenes have a density of about 0.905 to 0.940 grams/c.c. and a melt index of about 1.0 to 10.0.

* * * * *